Fig. 5.

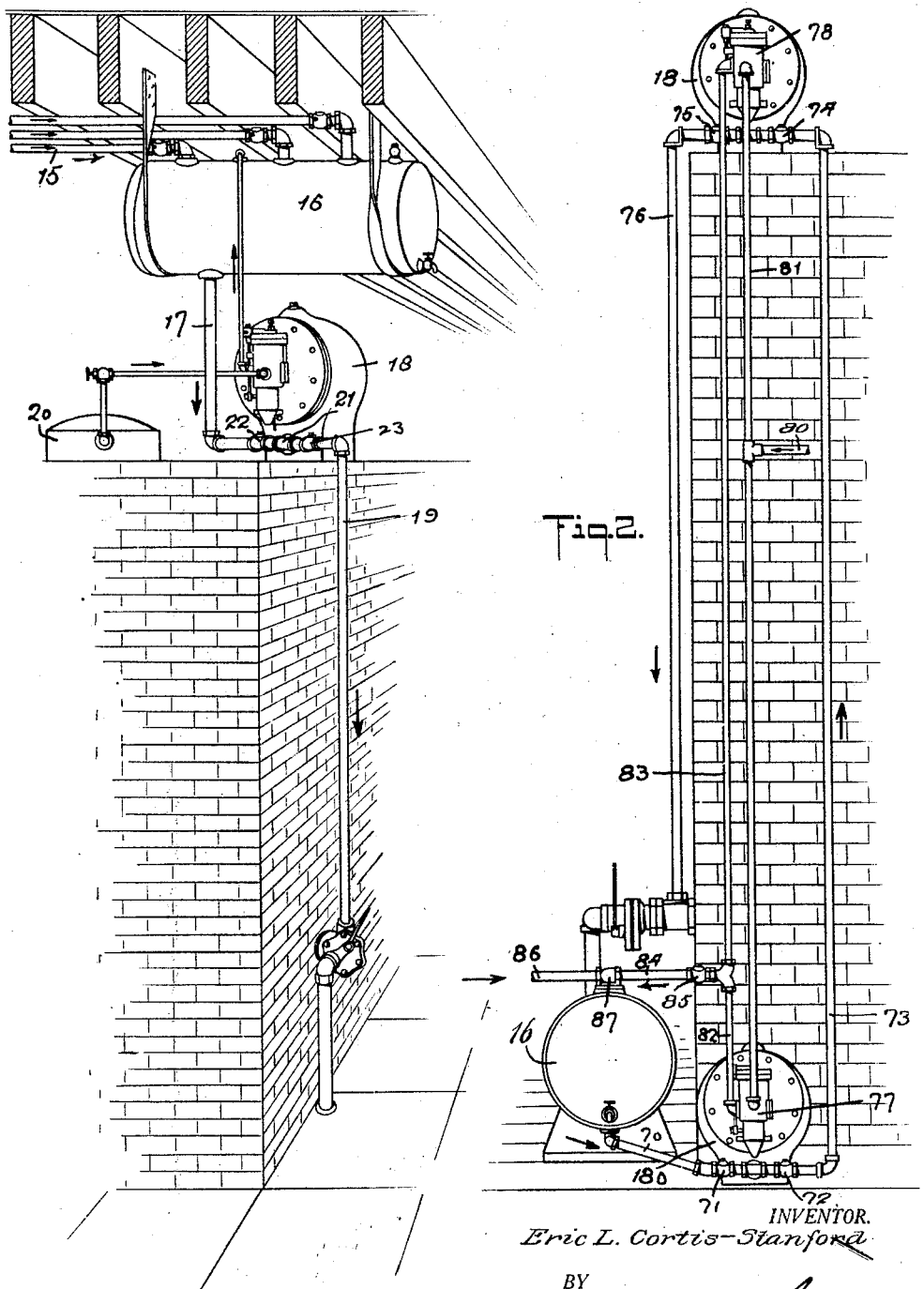

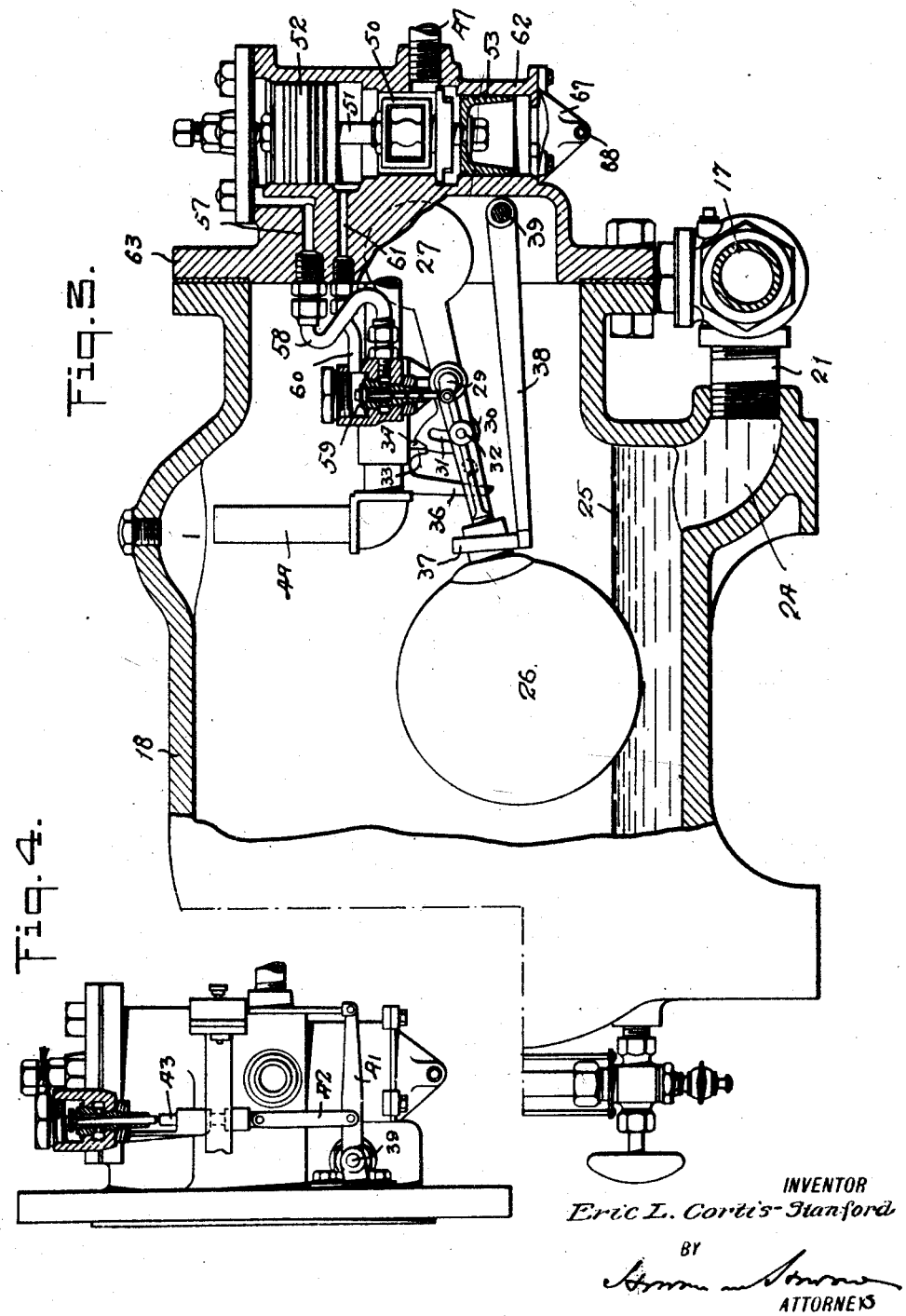

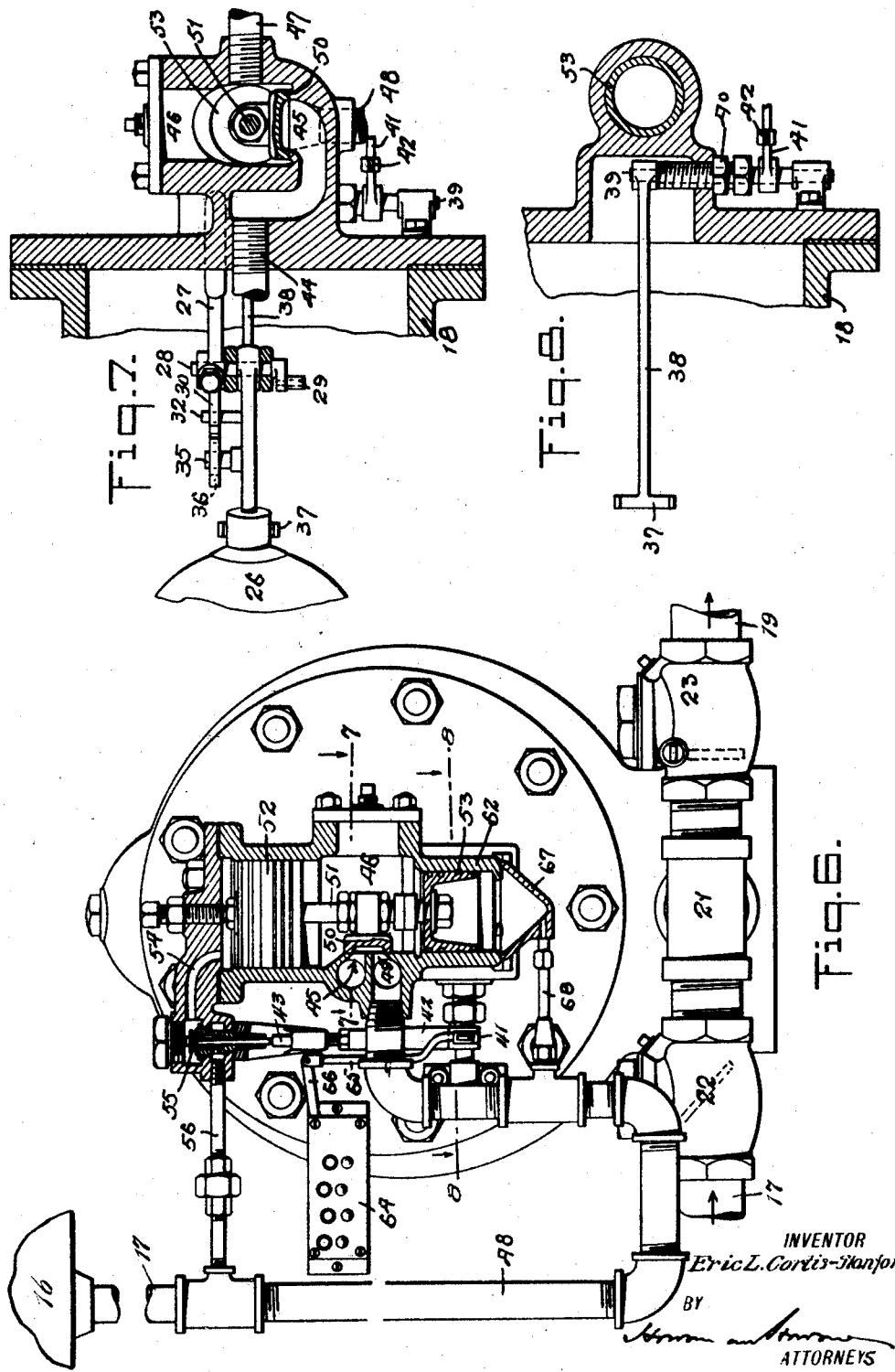

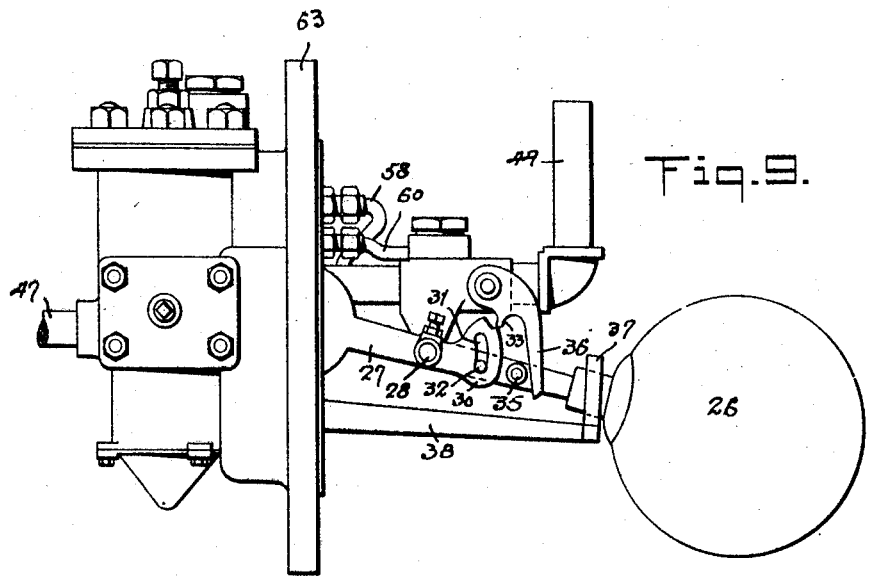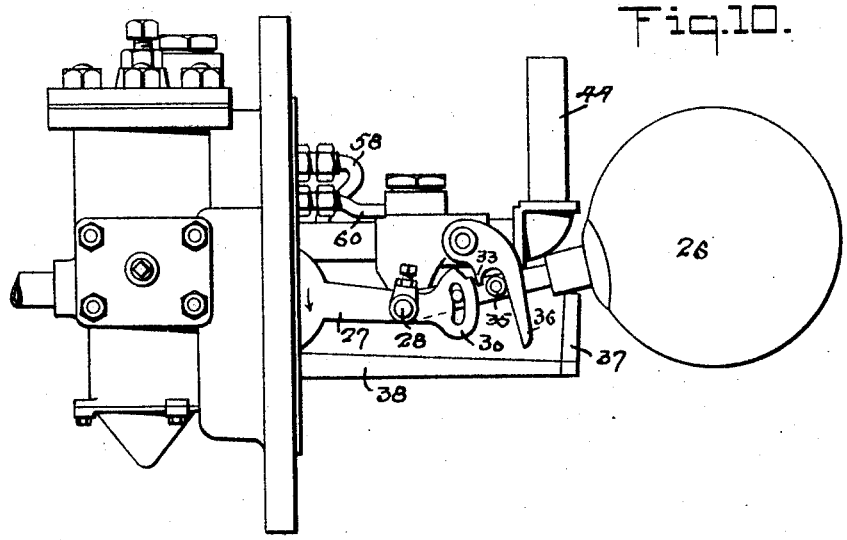

Patented July 19, 1927.

1,636,626

UNITED STATES PATENT OFFICE.

ERIC LORNE CORTIS-STANFORD, OF BIRMINGHAM, MICHIGAN, ASSIGNOR TO W. H. NICHOLSON & COMPANY, OF WILKES-BARRE, PENNSYLVANIA, A CORPORATION OF PENNSYLVANIA.

RETURN TRAP.

Application filed October 17, 1925. Serial No. 63,119.

My invention relates to a return trap, and particularly to a trap for collecting and returning condensate to a boiler, although my invention is applicable to any like system. Among the objects of my invention may be mentioned briefly—

(1) An automatically operating trap which collects liquid at low pressure and discharges at high pressure;

(2) An automatically operating trap which discharges by gravity at high pressure;

(3) A float-operated mechanism controlling the low and high pressure connections of the trap during collecting and discharging periods respectively;

(4) A differential piston controlling a cut-off valve at the high pressure inlet to the trap;

(5) A counter associated with the trap mechanism to indicate its operations;

(6) Various features of novelty in construction and system hereafter described or shown in the accompanying drawings, in which—

Fig. 1 is a perspective view illustrating the application of my invention to a layout in which the trap and an associated collecting tank are arranged above the boiler;

Fig. 2 is a side elevation of a modified arrangement in which the collecting tank and trap are arranged below the water level of the boiler, and a second trap above the latter for discharging to the boiler;

Fig. 3 is a broken side elevation through the trap illustrating the position of the parts when the trap has discharged;

Fig. 4 is a broken side elevation of the trap head and the exhaust valve for the differential piston;

Fig. 5 is a broken side elevation of the trap showing the position of the parts when the trap is about to discharge;

Fig. 6 is a broken end elevation of the trap;

Figs. 7 and 8 are partial sections on lines 7—7 and 8—8 respectively, Fig. 6;

Figs. 9 and 10 are side elevations of the trap head showing the float and trip mechanisms in different positions.

A return trap of the present type is particularly useful and is therefore shown in a heating system in which steam is carried at low pressure through heating pipes and radiators, say at a pressure of 5 pounds, (or over at subatmospheric pressure) from a boiler in which the pressure is relatively high, say 100 pounds. The function of the mechanism is to return the condensate to the boiler. The trap receives the condensate at the low pressure of the heating system and discharges it to the high pressure boiler by gravity. So far as I am aware such a system is broadly novel, as well as the means by which the return is accomplished.

Referring to Fig. 1, which illustrates a typical layout, the return piping 15 leads condensate from the radiators to a collecting tank 16. From the latter the water passes by intake pipe 17 to the trap 18 and is discharged thence by outlet pipe 19 to the lower portion of the boiler 20. The pipe 17 is connected to the trap through a T-fitting 21 in advance of which is arranged a check valve 22. The outlet pipe 19 is connected to the opposite branch of the T-fitting 21 through intermediate check valve 23, which is normally closed by pressure from the boiler 20.

From the T-fitting 21 the water 25 enters the trap 18 through port 24 and gradually fills the chamber while the latter is at low pressure. When the trap is filled to predetermined level, steam from the boiler 20 is admitted to the trap and places the chamber under boiler pressure. This results at once in closing the check valve 22 in feed line 17 from collecting tank 16. Inasmuch as the trap is now under a pressure corresponding to that in the boiler 20, the pressure upon opposite faces of check valve 23 in discharge line 19 is now balanced. The hydraulic head of the water in the trap now suffices to open the check valve 23, so that the water flows by gravity through outlet line 19 into the boiler. When the trap has sufficiently emptied, the mechanism again exhausts the trap chamber of its pressure, whereupon the check valve 23 is again automatically closed by pressure from the boiler, while check valve 22 now relieved from pressure, again opens to admit the condensate from the tank 16. The cycle repeats automatically.

The mechanism controlling the pressure in the trap chamber is operated by the float 26 and the associated weight lever 27, the latter fast with the axis 28 upon which the float is loosely journalled. A crank valve operating cam or crank 29 is fast with the axis 28 and moves with the rise and fall of the weight lever 27. The latter extends across the axis 28 and has a head 30 slotted at 31 to receive a pin 32 carried by the float lever and affording a lost motion connection therewith. A pivoted catch 33 engages a notch 34 in the head 30 of the weight arm and holds the latter in raised position, while the float ascends. When the float has risen to a predetermined extent, its pin 35 bears against the arm 36 of the catch and swings the latter free of the notch 34, thus releasing the weight 27 and permitting the latter to drop, and thus swing the crank 29 to valve-opening position.

As the float 26 drops, it engages a fork 37, at the free end of the lever 38, fast with pivot pin 39. The latter passes through the stuffing box 40 on the trap head and its outer end carries a crank arm 41, to which is connected a link 42 (Fig. 4), the opposite end of which engages the stem of a push rod 43, by means of which another valve, hereinafter referred to, is operated.

The pressure system for the trap comprises a pipe 44, open at one end to the float chamber and communicating at its opposite end through port 45 with a steam chest 46, constantly at boiler pressure through pipe 47 from the boiler 20. An exhaust pipe 48, which preferably leads to the receiving tank 16, although it may discharge to atmosphere if preferred, terminates at port 49 adjacent port 45. Ports 45 and 49 (Fig. 6) are spanned by a slide valve 50 of the U-type, by which they may be put in communication. In this position of the valve, the trap chamber is in communication with collecting chamber 16 (or atmosphere) through pipe 44, port 45, valve 50, port 49, and pipe 48.

The slide valve 50 is mounted upon rod 51 of a differential piston, the head 52 of which is of greater diameter than the head 53. When the pressure against the outer faces of the pistons is substantially equal, the boiler pressure in the steam chest 46, to which the adjacent ends of the piston cylinders open, shifts the pistons to the position indicated in Fig. 6 by reason of the greater area of the piston 52.

Figure 5:
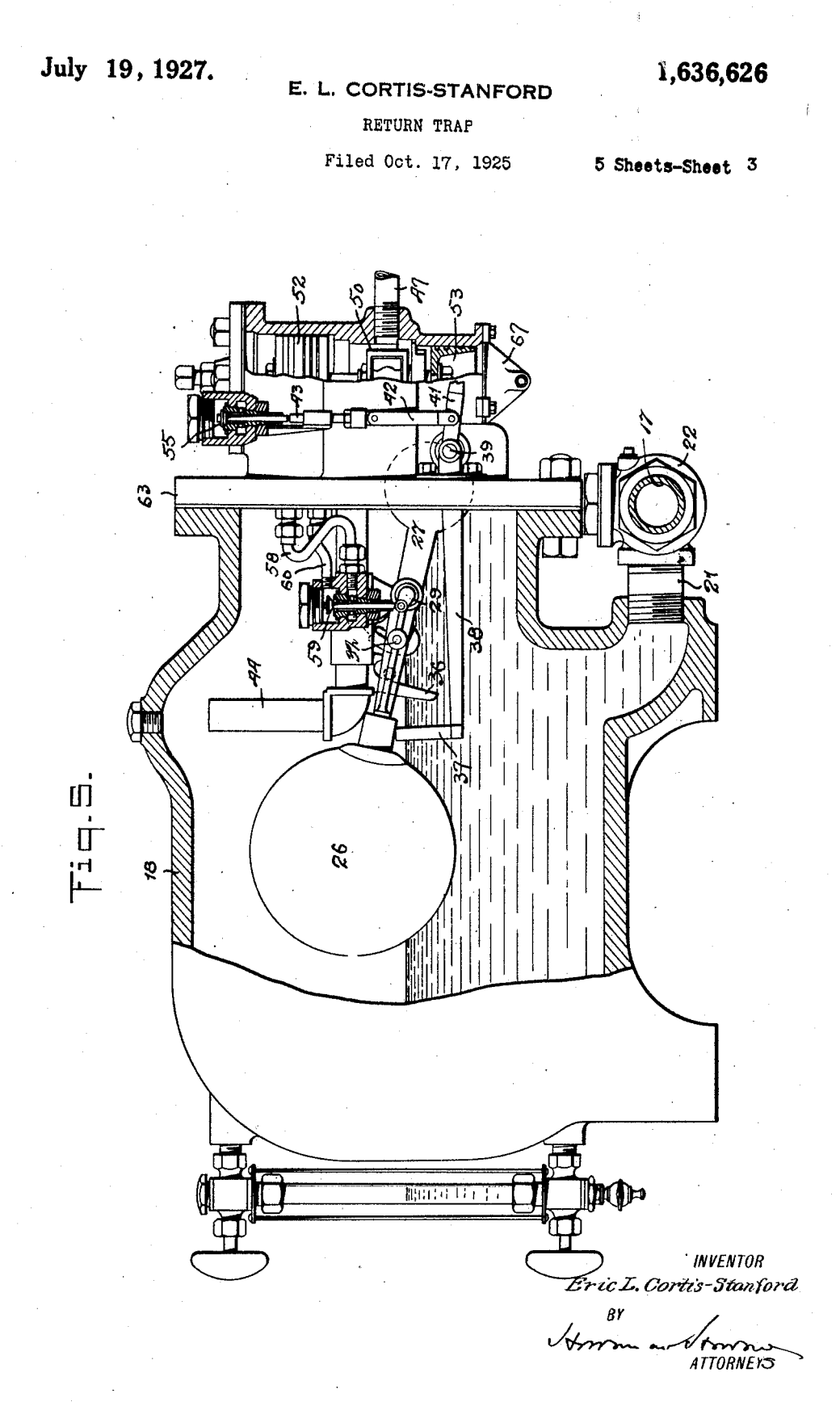

Communicating with the outer end of the cylinder for piston 52, is a passage 54 controlled by valve 55 and opening through pipe 56 to the exhaust line 48. Also opening to this end of the cylinder is a second passage 57 (Fig. 3) which connects through pipe 58 and valve 59 with pipe 60, which opens, through passage 61, to the steam chest. Obviously if the pressure against the inner face of the large piston 52 be balanced against its outer face by the admission of steam from the chest through passages 57, 58, valve 59 and passages 60, 61, the equalized pressures on opposite faces of this piston, coupled with the still unbalanced thrust against piston 53, results in the displacement of the piston 53 to its opposite extreme position (Fig. 5). This movement shifts the slide valve 50 to uncover port 45 (while maintaining port 49 closed), and steam from the chest 46 passes through pipe 44 to the interior of the trap (Fig. 5).

The boiler pressure thus admitted to the trap, results at once in closing the check valve 22 in the feed line 17. Inasmuch as pressure is now balanced on opposite sides of the check valve 23 in discharge line 19, the hydrostatic head of the water in the trap opens the check valve 23 and the water flows freely by gravity from the trap to the boiler.

When the trap has sufficiently discharged, valve 55 is opened, and the pressure against the outer face of piston 52 is relieved by the escape of the steam through passages 54 and 56 to the exhaust line 48. At once the differential piston returns to its original position, thus shifting the slide valve 50 to the position in which it spans the ports 45, 49. Steam under pressure in the trap now exhausts through the pipe 44 and ports 45, 49 to the exhaust line 48, check valve 23 automatically shuts under pressure from the boiler, while check valve 22 opens to admit condensate again to the trap from the tank 16. The cycle automatically repeats.

It will be observed that when the trap is drained (Fig. 3) the falling float 26 lifts the weight 27 and thus swings the crank 29 downward. This permits valve 59 to close, cutting off pressure to the outer end of piston 52. As the float falls further the float-operated lever 38 is depressed and kicks open valve 55 in line 54—56 through which the steam escapes from the outer end of the piston to the exhaust line 48. The differential piston then shifts automatically and returns the U-valve 50 to the position in which it spans the ports 45, 49, so that the trap exhausts its steam pressure, and restores conditions for re-entry of water from tank 16. When the float rises again it kicks off the trip 33, and the falling weight 27 rotates the crank 29 to open the valve 59 again, and the cycle of operations repeats.

A counter mechanism 64 may be associated with the lever 41 through the link 65 and lever 66, by which a record of the number of trap operations may be automatically kept. Since there may be some leakage past the piston 53, a drip cup 67 may be mounted beneath the lower end of the cylinder 62 and connected by pipe 68 with the exhaust line 48.

Under certain conditions it is necessary to arrange the collecting or sump tank 16 at the floor level of the boiler, in which case the water must be raised in some fashion to the trap 18 above the water level in the boiler, so that the trap may drain into the boiler by gravity, as above described. In some systems, sufficient pressure exists in the tank 16 to raise the water to the trap level, particularly if the exhaust from the float chamber of the trap be directly to atmosphere instead of to the tank 16. In other systems this is not feasible, and for such layouts, of which Fig. 2 may be regarded as typical, I supplement the trap 18 at the boiler head by a second trap 180 at the floor level. The tank 16 feeds the trap 180 through line 70 past check valve 71. The trap discharges past check valve 72 to riser 73, thence to trap 18 past check 74, and discharges from the trap past check 75 to downcomer 76 connected to the boiler. The steam chests 77—78 of both trap valve mechanisms are connected to the boiler through lines 80—81. The exhausts from the float chambers and differential piston cylinder ends of both traps connect through branches 82—83 with the return line 84 leading to the tank 16 past check 85. The tank receives condensate from the heating system through line 86 past check 87.

In a layout such as this, the trap 180 acts as a pump, since the pressure from riser 73 on check 72 does not equal that exerted upon the water in the float chamber by the steam when the latter is admitted by the valve mechanism (Figs. 3–10) above explained. Consequently the water in the trap 180 is driven up to trap 18 past checks 72–74, and thereafter discharges by gravity to the boiler through return 83 in the same manner as in the layout of Fig. 1.

Various details of the mechanism present advantages. Thus (1) the pressure chest and differential piston cylinders are cast in one with, and all the moving parts are carried on, the head 63 which forms an end closure of the float chamber casting 18. It is thus possible to mount all of the parts upon this head at a convenient work bench before assembly on casting 18. (2) All of the valves are held to their seats by steam pressure, and are positively opened against the latter. (3) The lost motion connection between the weight end 30 and float lever insures a quick snappy opening of the valve 59. (4) The admission of steam to the float chamber occurs above the water level. Consequently no disturbance of the water occurs when the pressure connection is established. (5) The exhaust follows the same line to the slide valve—and is in no danger of impedance. (6) The water inlet and outlet passages are of the simplest possible sort—as well as the check valves which control them. The latter are to a large extent self-clearing, and there is little or no danger of failure to seat properly or of becoming choked. (7) The exhaust pipe 48 has a U-bend in which condensate from the exhaust steam collects and is periodically blown into the tank 16 by the steam exhausted from the float chamber and cylinder head. (8) To install the trap requires only connections from the T-fitting 21 to tank 16 and boiler 20; and from steam chest 46 to the steam dome of the boiler; and preferably, though not necessarily, from the exhaust 48 to the tank 16. The trap is otherwise self-contained.

It will be realized that the collecting tank or sump 16 is merely a convenience which may be dispensed with, since the drainage lines 15 of the system may be connected directly with the trap feed line 18, while the float chamber exhaust 48 may discharge to atmosphere. Various other modifications of the system, as well as changes in detail of construction and arrangement of parts, which embody what I claim as my invention, will readily occur to those dealing with the problem.

With the understanding therefore that the drawings illustrate, and the foregoing description explains only specific embodiments of the thoughts which underlie my invention, I claim:

1. A return trap comprising a float chamber, a pivoted float therein, a pivoted weight lever, a float-operated trip for releasing the weight lever on the rise of the float, a piston-operated slide valve controlling the admission of pressure to the float chamber, a valve controlling the admission of pressure to the piston cylinder, and an operating connection between the weight lever and piston cylinder admission valve for opening the latter on the fall of the weight lever.

2. A return trap comprising a float chamber, a pivoted float therein, a pivoted weight lever, a float-operated trip for releasing the weight lever on the rise of the float, a piston-operated slide valve controlling the admission of pressure to the float chamber, a valve controlling the admission of pressure to the piston cylinder, and an operating connection between the weight lever and piston cylinder admission valve for opening the latter on the fall of the weight lever, in combination with a relief valve associated with the piston cylinder, a lever for opening said valve, and an operating connection between said lever and the float for actuating the lever upon the fall of the float.

3. A return trap comprising a trap body and a closure head therefor, a pressure chest on the outer face of said head with differential piston cylinders at opposite ends of said chest, means for establishing constant communication between said chest and a source of pressure, ports opening from said chest respectively to the interior of the trap body and to an exhaust line, a slide valve controlling said ports, differential pistons arranged in said cylinders and operating said slide valve, a passage opening from said steam chest to the outer face of one of said pistons, a valve mounted on the inner face of said closure head and controlling said passage, in combination with a float pivotally supported on the inner face of said head, a pivoted weight lever also supported at the inner face of said head, a float-operated trip device supporting said weight lever in raised position but float operated to release said weight lever on the rise of the float, and an operating connection between said weight lever and said valve in the control passage to open said valve on the fall of the weight lever to establish equalizing pressure on opposite faces of one of said differential pistons whereby the latter is displaced by the unbalanced pressure against the other piston and thus shifts the slide valve to uncover the port leading from the chest to the interior of the float chamber.

4. A return trap comprising a trap body and a closure head therefor, a pressure chest on the outer face of said head with differential piston cylinders at opposite ends of said chest, means for establishing constant communication between said chest and a source of pressure, ports opening from said chest respectively to the interior of the trap body and to an exhaust line, a slide valve controlling said ports, differential pistons arranged in said cylinders and operating said slide valve, a passage opening from said steam chest to the outer face of one of said pistons, a valve mounted on the inner face of said closure head and controlling said passage, in combination with a float pivotally supported on the inner face of said head, a pivoted weight lever also supported at the inner face of said head, a float-operated trip device supporting said weight lever in raised position but float operated to release said weight lever on the rise of the float, and an operating connection between said weight lever and said valve in the control passage to open said valve on the fall of the weight lever to establish equalizing pressure on opposite faces of one of said differential pistons whereby the latter is displaced by the unbalanced pressure against the other piston and thus shifts the slide valve to uncover the port leading from the chest to the interior of the float chamber, together with a relief passage opening to the equalizing chamber of said piston cylinder, a valve controlling said relief passage, a lever for opening said relief valve, and means actuated by the fall of the float to open said valve, whereby the differential pistons are returned to normal position and the interior of the trap is placed in communication through said slide valve with the exhaust passage.

5. In a return trap, a float chamber body, a closure head therefor, a piston-operated slide valve arranged in the outer face of said closure head, a relief valve arranged in the outer face of said closure head to control the exhaust from the slide valve operating piston, in combination with a float arranged within the trap chamber and pivotally mounted at the inner face of said closure head, a lever pivoted in said closure head and having an associated element extending to the outer face of said closure head to operate said relief valve, the portion of said lever extending within the trap chamber being operatively associated with the float for actuation by the float on the fall of the latter.

6. In a return trap, a float chamber body, a closure head therefor, a piston-operated slide valve arranged in the outer face of said closure head, a relief valve arranged in the outer face of said closure head to control the exhaust from the slide valve operating piston, in combination with a float arranged within the trap chamber and pivotally mounted at the inner face of said closure head, a lever pivoted in said closure head and having an associated element extending to the outer face of said closure head to operate said relief valve, the portion of said lever extending within the trap chamber being operatively associated with the float for actuation by the float on the fall of the latter, together with a counter mechanism arranged at the outer face of said closure head and actuated by said lever element.

7. A return trap having a piston-operated slide valve controlling admission of pressure to and from the trap chamber, a pressure control chamber associated with the slide valve operating piston, a float lever within the chamber, a weight lever lifted by the fall of the float, a trip device for sustaining the weight lever, means associated with the float for releasing said trip on the rise of the float to permit the weight lever to fall, together with a valve opened by the fall of the weight lever to admit pressure to the piston control chamber.

8. A return trap having a piston-operated slide valve controlling admission of pressure to and from the trap chamber, a pressure control chamber associated with the slide valve operating piston, a float lever within the chamber, a weight lever lifted by the fall of the float, a trip device for sustaining the weight lever, means associated with the float for releasing said trip on the rise of the float to permit the weight lever to fall, together with a valve opened by the fall of the weight lever to admit pressure to the piston control chamber, in combination with a relief valve associated with said control chamber, and an operating lever therefor actuated by the fall of the float.

In testimony whereof I have signed my name to this specification.

ERIC LORNE CORTIS-STANFORD.